Feb. 21, 1961 P. J. HOOPER 2,972,333
LAYING NEST
Filed April 7, 1959 2 Sheets-Sheet 1
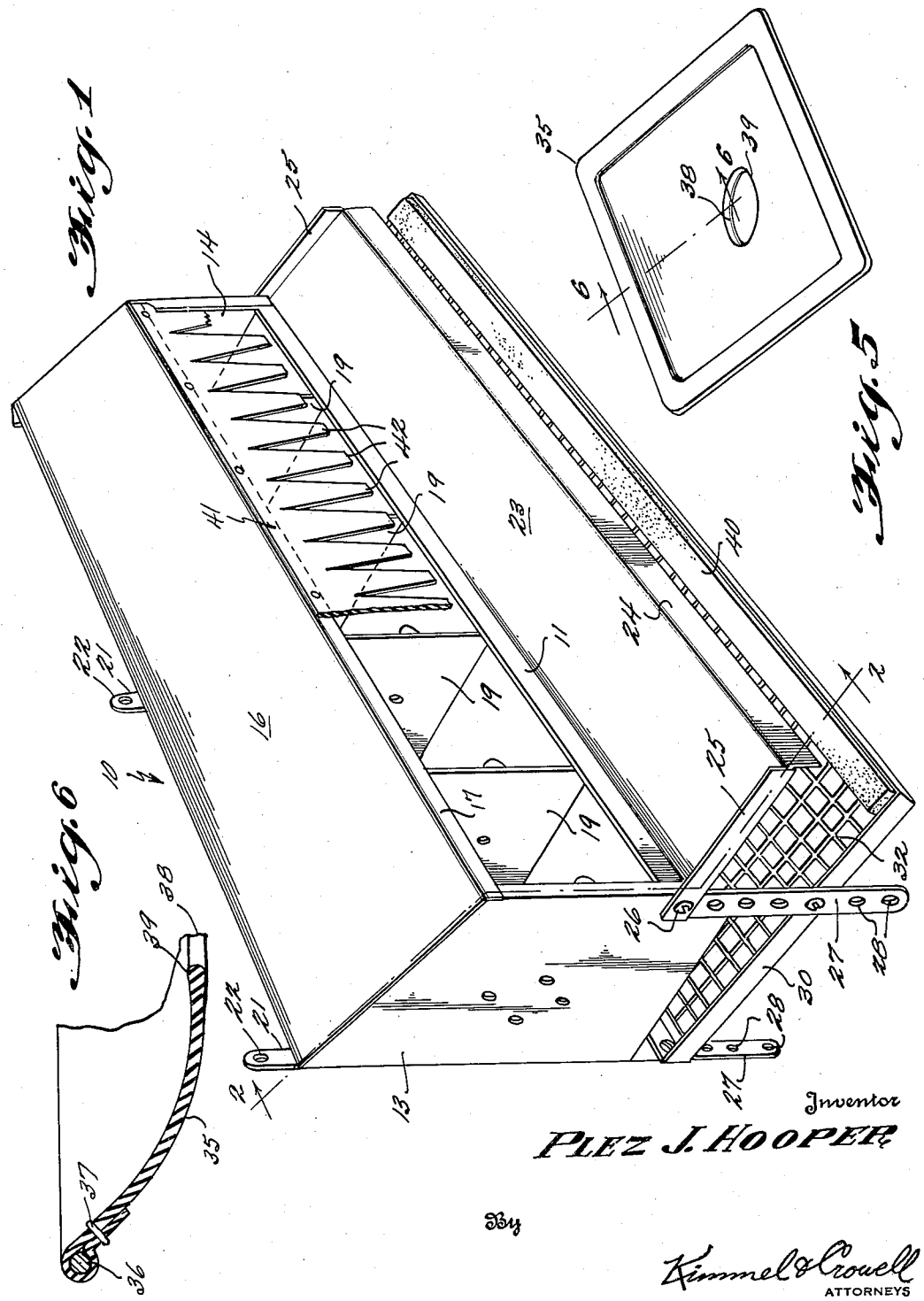
Inventor
PLEZ J. HOOPER
By
Kimmel & Crowell
ATTORNEYS

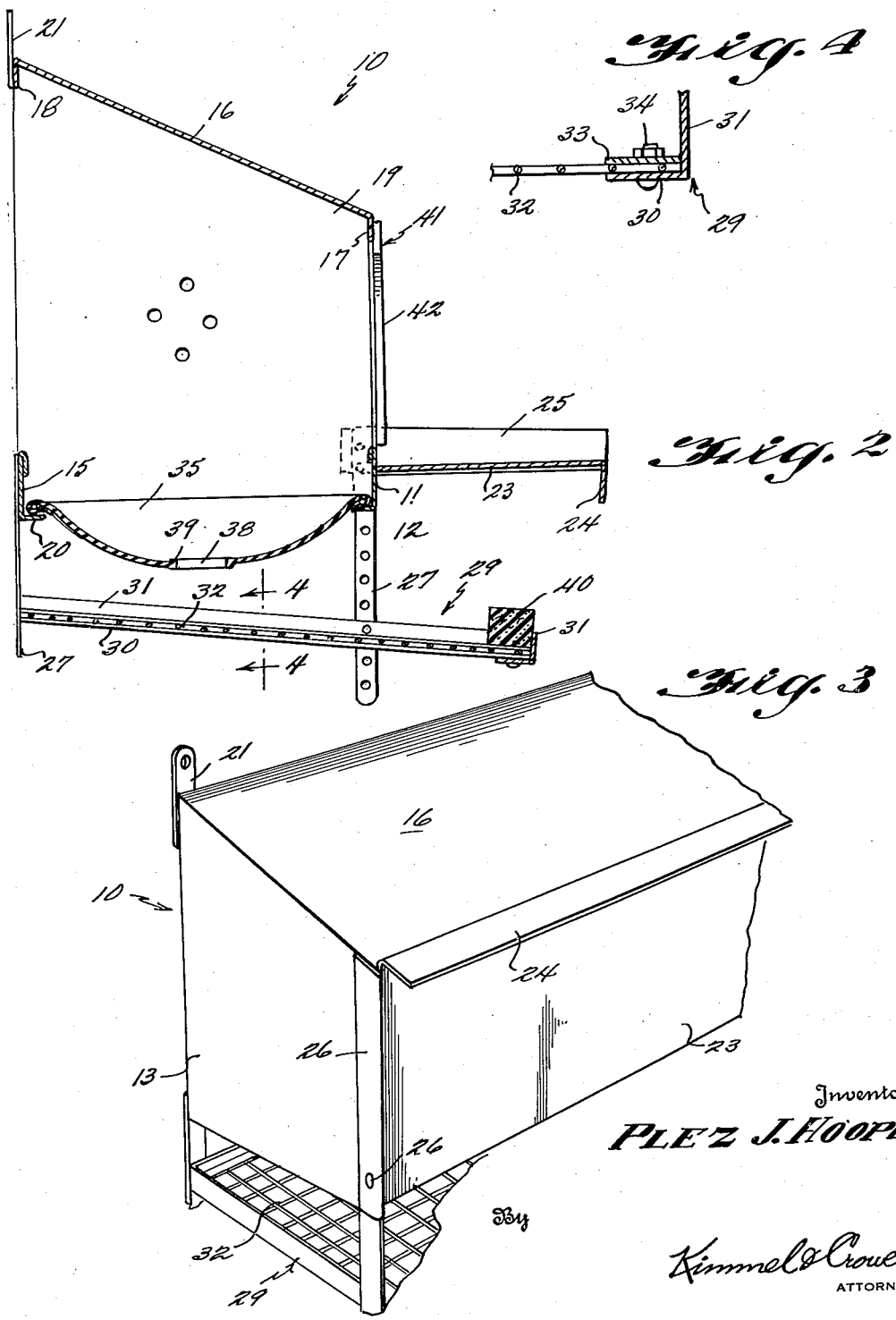

United States Patent Office 2,972,333
Patented Feb. 21, 1961

2,972,333

LAYING NEST

Plez J. Hooper, Hastings, Okla.

Filed Apr. 7, 1959, Ser. No. 804,705

1 Claim. (Cl. 119—45)

The present invention relates to a laying nest and particularly to laying nests which deliver the eggs therefrom.

The primary object of the invention is to provide a laying nest constructed to eliminate nesting litter so that the nests require less cleaning, thereby providing better eggs which are kept cleaner, cooler and, further, are protected against breakage.

Another object of the invention is to provide a nest structure of the class described above which will harbor less insects, disease germs and the like.

A further object of the invention is to provide a laying nest from which the eggs are delivered to a convenient point so that they may be gathered without unduly disturbing the hens.

Another object of the invention is to provide a laying nest of the class described above having means by which the nest can be closed off when it is not to be used.

Other objects and advantages will become apparent in the following specification when considered in light of the attached drawings, in which:

Figure 1 is a perspective view of the invention;

Figure 2 is a vertical sectional view taken along the line 2—2 of Figure 1, looking in the direction of the arrows;

Figure 3 is a fragmentary perspective view showing the nest closed;

Figure 4 is an enlarged fragmentary vertical section taken along the line 4—4 of Figure 2, looking in the direction of the arrows;

Figure 5 is a perspective view of one of the nest bottoms; and

Figure 6 is an enlarged fragmentary vertical section taken along the line 6—6 of Figure 5, looking in the direction of the arrows.

Referring now to the drawings in detail wherein like reference characters indicate like parts throughout the several figures, the reference numeral 10 indicates generally a laying nest structure constructed in accordance with the invention.

The laying nest structure 10 includes a relatively short front wall 11 having a horizontal flange 12 formed on its lower edge and extending inwardly therefrom. A pair of spaced apart parallel end walls 13, 14 are secured to opposite ends of the front wall 11. A relatively short rear wall 15 extends parallel to the front wall 11 connecting the lower rear edges of the end walls 13, 14. A top wall 16 is secured to the end walls 13, 14 and is provided with front and rear depending flanges 17, 18 respectively. The top wall 16 slopes downwardly and forwardly toward the front wall 11.

A plurality of partition walls 19 are arranged in spaced parallel relation between the front wall 11, rear wall 15 and in engagement with the top wall 16. The partition walls 19 divide the nest 10 into a plurality of generally rectangular compartments. The rear wall 15 has a forwardly extending perpendicular flange 20 formed on its lower edge and arranged in aligned relation to the flange 12 on the front wall 11.

A plurality of ears 21 are secured to the flange 18 on the top wall 16 and extend upwardly therefrom. The ears 21 are each provided with an aperture 22 through which mounting fasteners (not shown) extend to mount the nest 10 to a wall.

A perch 23 consists of an elongated rectangular panel having an elongated perpendicularly depending flange 24 integrally secured to the outer edge thereof. Upstanding flanges 25 are integrally formed on opposite ends of the perch 23, as can be clearly seen in Figure 6. Pivot bolts 26 extend through the inner ends of the flanges 25 pivotally securing the perch 23 to the end walls 13, 14 of the nest 10. In its horizontal position, the perch 23 provides an access floor for the nest 10. The perch 23 can be folded inwardly to cover the nest 10, as illustrated in Figure 3.

A plurality of straps 27 depend from the nest 10 and have vertically spaced apertures 28 formed therein. A generally rectangular angle iron frame 29 has a plurality of inwardly extending horizontal flanges 30 and a plurality of upstanding flanges 31. A plastic mesh screen 32 is clamped to the horizontal flanges 30 by plates 33 and bolts 34 with the screen 32 underlying the nest 10.

A generally rectangular dished rubber nest bottom 35 has a generally rectangular metallic frame 36 over which the edges of the nest bottom 35 are reverted and secured by securing elements 37, as shown in Figure 6. The nest bottom 35 has a central opening 38 with the material of the nest bottom 35 thickened at 39 to provide reinforcing for the central opening 38. The nest bottom 35 rests on the flanges 12, 20 on the front wall 11 and rear wall 15 overlying the screen 32, as can be clearly seen in Figures 1 and 2.

An elongated cushion 40 is secured to the forward end of the frame 29 and the frame 29 is secured to the straps 27 with the forward end thereof arranged considerably lower than the rear end to permit eggs falling through the opening 38 in the nest bottom 35 to roll forwardly against the cushion 40.

A curtain, generally indicated at 41, includes a plurality of flexible strips 42 secured to the flange 17 of the top wall 16 and positioned above the front wall 11, as best shown in Figure 1. The curtain 41 serves to darken the nest and also to provide privacy for the laying hen to prevent loss from pick-outs from other hens.

In the use and operation of the invention, the hens gain access to the nest compartments by use of the perch 23 and lay with the eggs dropping through the openings 38 in the nest bottoms 35 on to the screen 32. The eggs then roll forwardly against the cushion 40 for gathering. When the eggs are to be gathered, the perch 23 is folded upwardly into covering position, as illustrated in Figure 3, to permit access to the eggs on the screen 32 against the cushion 40 and also to prevent the hens on the nest from being frightened by the person gathering the eggs. The perch 23 can also be used to prevent the hens from laying at night, or from roosting in the nest.

The nest bottom 35 shown in Figure 5 can be readily removed for cleaning same and easily replaced so that the nests can at all times be kept in a sanitary condition.

The component parts of the nest 10 are metal sheets which are provided with adequate ventilation openings to permit the nests to be properly ventilated.

Having thus described the preferred embodiment of the invention, it should be understood that numerous structural modifications and adaptations may be resorted to without departing from the scope of the appended claim.

What is claimed is:

A laying nest comprising an elongated container having a plurality of compartments formed therein, a centrally apertured flexible nest bottom supported in each compartment, said flexible nest bottom comprising a dished rubber member having a rigid frame secured to the peripheral edge thereof and having the central aperture therein defined by a reinforced thickened portion of said flexible member, a plastic screen positioned below said nest bottom and sloping downwardly and forwardly, said screen being secured to said nest for vertical adjustment in relation thereto a cushion supported on the forward lower end of said screen to be engaged by eggs rolling on said screen, a perch mounted on said nest in generally horizontal relation to said nest, each of said compartments having an entrance adjacent said perch, said perch pivotally mounted to swing from its horizontal position to a vertical position to close said entrances, said nest having a plurality of flexible strips secured thereto forming a curtain over the entrances to said nests.

References Cited in the file of this patent

UNITED STATES PATENTS

| | | |
|---|---|---|
| 2,673,550 | Magaard et al. | Mar. 30, 1954 |
| 2,683,438 | Peterson | July 13, 1954 |

FOREIGN PATENTS

| | | |
|---|---|---|
| 492,207 | Great Britain | Sept. 16, 1938 |